UNITED STATES PATENT OFFICE.

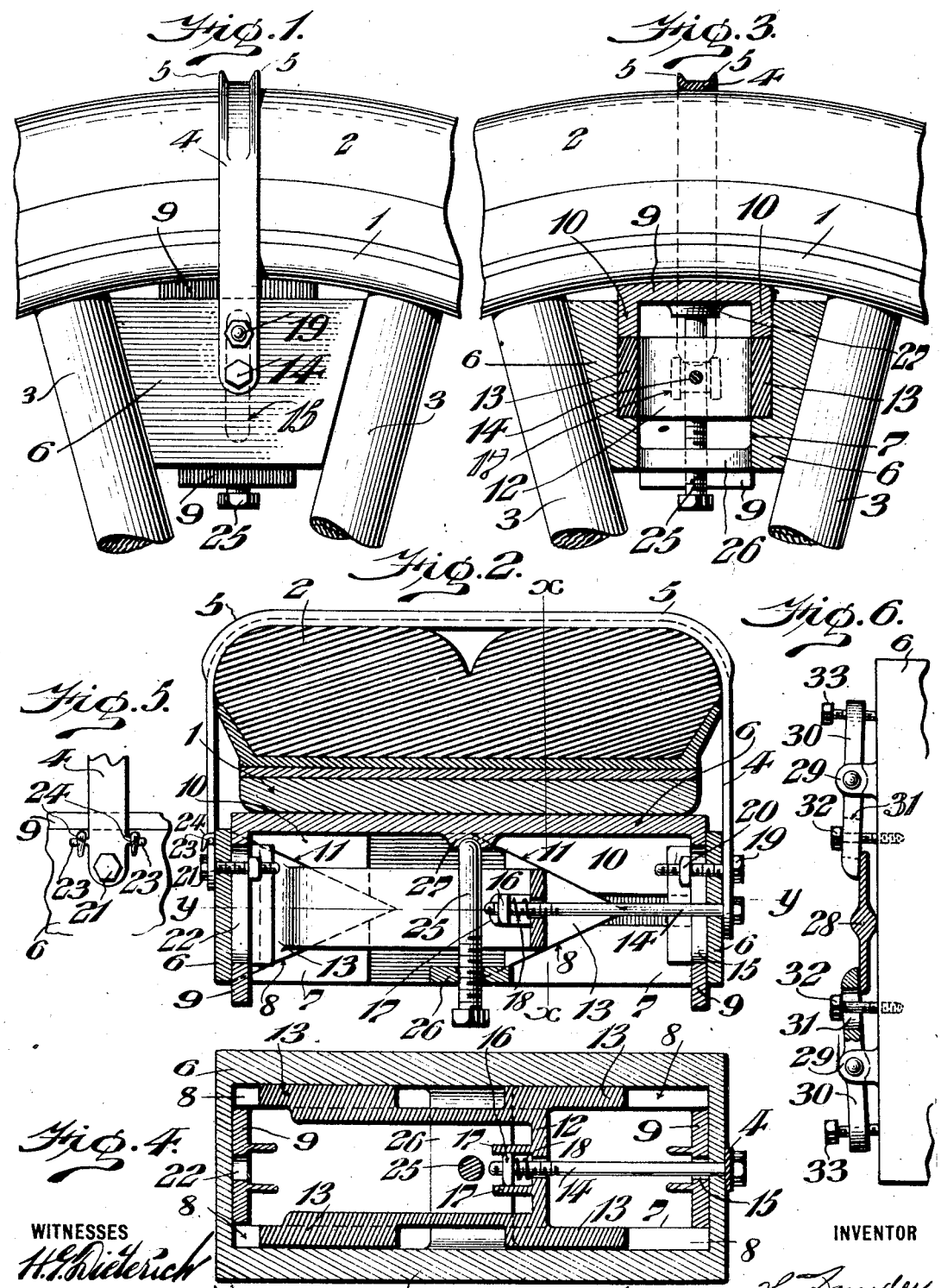

WILLIAM H. SNYDER, OF ASHBOURNE, PENNSYLVANIA.

ANTISKIDDING DEVICE.

1,049,617.  Specification of Letters Patent.  Patented Jan. 7, 1913.

Application filed January 24, 1912. Serial No. 673,071.

*To all whom it may concern:*

Be it known that I, WILLIAM H. SNYDER, a citizen of the United States, residing at Ashbourne, county of Montgomery, State of Pennsylvania, have invented a new and useful Antiskidding Device, of which the following is a specification.

My invention consists of an improved device for preventing skidding of the wheels of power-driven vehicles, which may be readily attached and detached to and from the wheel.

It further consists of improved means for tightening such device upon the rim and tire of a wheel.

It further consists of improved means for retaining the clip in position.

It further consists of other novel features of construction, all as will be hereinafter fully set forth.

The annexed drawings and the following description set forth in detail one mechanical form embodying the invention, such detail construction being but one of various mechanical forms in which the principle of the invention may be used.

In said annexed drawings—Figure 1 represents a side elevation of parts of the rim, tire and spokes of a wheel, showing my device in position. Fig. 2 represents a transverse section of said parts. Fig. 3 represents a side elevation of parts of the rim, tire and spokes and a section of the device taken on the line *x—x* in Fig. 2. Fig. 4 represents a section on the line *y—y* in Fig. 2. Fig. 5 represents a detail view of the inner end of one limb of the clip and the means for securing it against tilting. Fig. 6 represents a detail view of clamping means for securing the device in a wheel having flat spokes.

Similar numerals of reference indicate corresponding parts in the figures.

Referring to the drawings:—1 designates the rim of a vehicle wheel having the tire 2 and spokes 3, all of which parts may be of any desired or suitable construction. The anti-skidding device is preferably formed of the plate or band 4 or any suitable or desired construction, and preferably provided with ears or projections 5 which serve to bite or engage with the roadway in order to prevent skidding or slipping of the wheels. Suitable means are provided for attaching and firmly holding the band in position on the rim and tire, and which consists of the outer frame 6 of a suitable shape and size, which is provided with the members 7 adjacent the upper side edges thereof and each of which members is provided with the inclined shoulders or cam faces 8.

9 designates an inner frame adapted to interfit with the outer frame 6, and which is provided with the members 10 on the sides thereof adjacent the lower portion, and each of which members is provided with the inclined shoulders or cam face 11, facing the cam faces 8.

12 designates a laterally movable separator which is provided on opposite sides thereof with the oppositely inclined shoulders or double cam members 13 forming a wedge member, the inclined shoulders or cam faces of which are adapted to contact with or ride upon, as will hereinafter be explained, the cam faces 8 and 11 of the side members 7 and 10.

14 designates a bolt or pin which passes through a suitable opening in the outer frame 6, and is movable in the slot 15 in the end of the inner frame 9, said pin or bolt 14 being in suitable connection with the separator 12 in order that by the actuation of the pin 14, the separator 12 may be moved to cause the two frames to have relative sliding movement with respect to each other. In the present instance, this connection is accomplished by means of a nut 16 on the threaded end of the bolt which is seated between the ears 17, carried by the separator 12. A spring 18 bearing upon said nut and a suitable portion of the separator 12 serves as a resilient bearing between the parts.

As will be seen more particularly from Fig. 2, the pin or bolt 14 passes through a suitable opening in the band 4 and serves to hold the same in position. A second screw or bolt 19 also passes through the band 4 and is held in place by a nut 20 in order to prevent lateral or swinging movement of the band 4 with respect to the frame 6 and the tire 2 and so that it will be held firmly in radial position when the parts are locked. The opposite end of the band is held in place by the bolt 21 passing through the outer frame 6 and seated in the slot 22 in the inner frame, in order that the latter may freely move with respect to the outer frame. The band 4 is also provided with the pins 23 which are engaged by the hooks 24, carried by the outer frame 6, which also serves to prevent swinging or lateral movement of the band.

The operation of the device will be readily apparent. The fastening device is placed between two of the spokes and the band is passed around the rim and tire, as seen in Figs. 1 and 3, and suitably connected with the outer frame 6. By a proper rotation of the pin 14, the separator or expander 12 will be actuated in order to cause the cam members 13 thereof to be moved in a proper direction, as seen in Fig. 2, to the right in order to cause the cam face thereof to ride upon the cam faces of the members 7 and 10. This will cause relative movement between the frames and will force the relative cam faces, carried thereby, apart moving the inner frame toward the rim 1 and so against the same, and forcing the outer frame 6 away from the rim, and as the band is connected with the outer frame, it will readily be seen that the movement will cause the said band 4 to firmly grip the tire 2, and the said band and parts will be firmly and securely held in position.

I may desire to provide a device for assisting in holding the parts in position, and in Fig. 2 I have shown a bolt or screw 25 in engagement with a cross bar 26, carried by the outer frame 6, and which bolt or screw is adapted to rest in a boss or other suitable means 27, on the inner frame, said screw or bolt 25 being common to said frames and independent of said expander and serving to hold the parts in their adjusted position and assist in carrying the strain.

It will be seen that the device is simple in construction, positive in action, and can easily be placed in position or removed from the wheel. Any number of these devices may be used around a wheel that may be necessary to prevent skidding or slipping thereof.

I have shown in Figs. 1 and 3 the side walls of the outer frame 6 as inclined to conform to the inclination of the spokes 3, but this may not be necessary in all instances, and any suitable form of outer frame may be employed which will accomplish the desired results. As shown, the outer frame as it is moved away from the rim 1 will have a wedging action with the spokes 3, but will assist in holding the same in position.

In some instances I may provide a construction shown in Fig. 6, where the spoke 28 is of a flat type as seen, and to this end I provide ears or lugs 29 on the outer frame 6, in which ears I mount the levers 30, each of which is provided with a slot 31 through which passes a screw 32 which is carried by the outer frame 6, and a set screw 33 carried by the lever at the opposite end thereof and bearing, as will be apparent, upon the frame 6. One end of each lever 30 is placed in engagement with a spoke 28, and by proper manipulation of the screws the said levers will firmly grip the spoke, which latter will be firmly held between the said levers and the frame 6, as is evident.

Having thus described my invention, what I claim as new and desire to secure by Letters Patent, is:—

1. In a vehicle wheel, a rim, a tire, a band adapted to seat on the tire, a frame to which the band is connected, a second frame adapted to engage the said rim, a wedge member engaging both frames, and means for actuating said wedge member laterally for separating said frames.

2. In a vehicle wheel, a rim, a tire, a band adapted to engage the tire, a frame to which the band is connected and having inclined shoulders thereon, a second frame movable with respect to said first frame and having inclined shoulders, an expander intermediate said frames and having inclined shoulders thereon adapted to engage the inclined shoulders of both frames, and means for laterally moving said expander for radially separating said frames.

3. In a vehicle wheel, a rim, a tire, a band adapted to engage the tire, a frame to which the band is connected and having cam faces thereon, a second frame movable with respect to the first frame and having cam faces thereon, an expander having cam faces thereon adapted to engage the cam faces of the two frames, means for actuating the expander, and a resilient connection between the expander and the actuating means.

WILLIAM H. SNYDER.

Witnesses:
C. D. McVay,
N. Bussinger.

Copies of this patent may be obtained for five cents each, by addressing the "Commissioner of Patents, Washington, D. C."